(12) United States Patent
Liu et al.

(10) Patent No.: US 7,205,699 B1
(45) Date of Patent: Apr. 17, 2007

(54) SOLID STATE ACTUATION USING GRAPHITE INTERCALATION COMPOUNDS

(75) Inventors: Ping Liu, Thousand Oaks, CA (US); Cameron G. Massey, Hawthorne, CA (US); Geoffrey P. McKnight, Los Angeles, CA (US); William Barvosa-Carter, Ventura, CA (US); Guillermo Herrera, Winnetka, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 11/212,273

(22) Filed: Aug. 27, 2005

Related U.S. Application Data

(60) Provisional application No. 60/605,055, filed on Aug. 28, 2004.

(51) Int. Cl.
*A61F 2/08* (2006.01)
(52) U.S. Cl. ...................................... 310/300
(58) Field of Classification Search ................. 310/300
See application file for complete search history.

(56) References Cited

U.S. PATENT DOCUMENTS 6,577,039 B2 * 6/2003 Ishida et al. ................ 310/300

FOREIGN PATENT DOCUMENTS

EP        1 050 338 A2 *  7/2003
JP        2-131376      *  5/1990

OTHER PUBLICATIONS

Bar-Cohen, Y., "Electro-active polymers: current capabilities and challenges" Proc. SPIE vol. 4695 (2002) Smart Structures and Materials Symposium, San Diego, CA.
Baughman, R.H., Cui, C., Zakhidov, A.A., Iqbal, Z, Barisci, J.N., Spinks, G.M., Wallace, G.G., Mazzoldi, A., De Rossi, D., Rinzler, A.G., Jaschinski, O., Roth, and S., Kertesz, M., "Carbon Nanotube Actuators," Science vol. 284, pp. 1340-1344 May 21, 1999.
McKinnon, W.R., and Haering, R.R., "Physical Mechanisms of Intercalation" Modern Aspects of Electrochemistry No. 15 ed. by White, Bockris and Conway, Plenum Press, NY, pp. 235-304 (1983).
Ebert, L.B., "Intercalation Compounds of Graphite" Annual Review of Materials Science, vol. 6, pp. 181-211 (1976).

(Continued)

*Primary Examiner*—Evan Pert
(74) *Attorney, Agent, or Firm*—Christopher R. Balzan

(57) ABSTRACT

In some embodiments, an actuator is provided having a graphite comprising actuation region located between electrodes. An ion storage region is located between the electrodes, with a separator region between the actuation and the storage region. The actuation region may include graphite structures embedded in an elastic matrix, the elastic matrix is adapted to allow transport of chemical species capable of intercalating within the graphite structures. A separator region is located between the electrodes, along with an ion generation region capable of reversible electrochemical production and elimination of ions. In some embodiments, an actuator is provided with at least one of the electrode and the counter electrode including graphite. An electrolyte therebetween having a graphite intercalate ion source.

45 Claims, 7 Drawing Sheets

OTHER PUBLICATIONS

Besenhard, J.O., Wudy, E., Mohwald, H., Nicki, J.J., Biberacher, W., and Foag, W., "Anodic Oxidation of Graphite in H2SO4 Dilatometry—In Situ X-Ray Diffraction—Impedance Spectroscopy," Synthetic Metals, 7, pp. 185-192 (1983).

Kofod, G., Kornbluh, R., Pelrine, R., and Sommer-Larsen, P., "Actuation response of polyacrylate dielectric elastomers", Proc. SPIE vol. 4329, pp. 141-147 (2001).

Baughman, R.H., "Conducting polymer artificial muscles," Synthetic Metals 78, pp. 339-353 (1996).

Beaulieu, L.Y., Eberman, K.W., Turner, R.L., Krause, L.J., and J.R. Dahn, "Colossal Reversible Volume Changes in Lithium Alloys," Electrochemical and Solid-State Letters, 4, (9) A137-A140 (2001).

Besenhard, J.O., Yang, J., and Winter, M., "Will advanced lithium-alloy anodes have a chance in lithium-ion batteries?", Journal of Power Sources 68, (1997) 87-90.

Lee, S.J., Lee, H.Y., Jeong, S.H., Baik, H.K., and Lee, S.M., 2002, "Performance of tin-containing thin-film anodes for rechargeable thin-film batteries," Journal of Power Sources 111, (2002) 345-349.

Spinks, G.M., Zhou, D., Liu, L., and Wallace, G.G., 2003, "The amounts per cycle of polypyrrole electromechanical actuators," Smart Materials and Structures 12, (2003) pp. 468-472.

Winter, M., and Besenhard, J.O., "Electrochemical lithiation of tin and tin-based intermetallics and composites," Electrochimica Acta (1999) 45, pp. 31-50.

\* cited by examiner

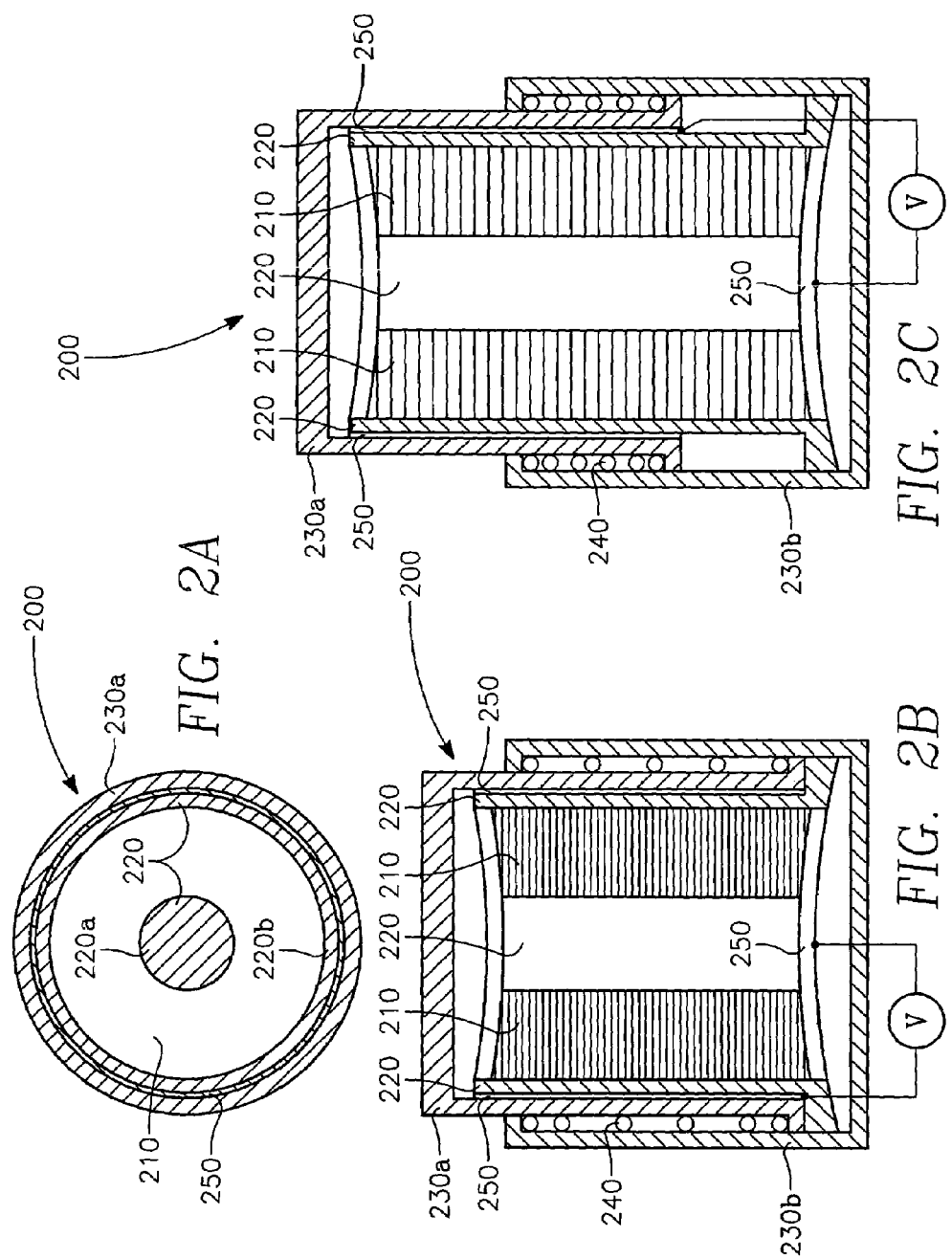

SOLID STATE ACTUATION USING GRAPHITE INTERCALATION COMPOUNDS

CROSS REFERENCE TO RELATED APPLICATION

This application claims the benefit of U.S. Provisional Application No. 60/605,055, filed on Aug. 28, 2004, by Liu, et al., entitled SOLID STATE ACTUATION USING GRAPHITE INTERCALATION COMPOUNDS, herein incorporated by reference in its entirety.

This application is related to of U.S. patent application Ser. No. 10/927,965, by Liu et al., filed Aug. 28, 2004, entitled ACTUATION USING LITHIUM/METAL ALLOYS AND ACTUATOR DEVICE, herein incorporated by reference in its entirety.

BACKGROUND

Scalable materials-based solid state actuation is considered to be a critical enabling technology for advanced adaptive and reconfigurable structures, particularly for aerospace applications where scale and weight concerns limit the use of currently available hydraulic and electric systems. The capabilities of an ideal mechanism covering this implementation include simultaneous high-strain (>100%) at substantial loads (>10 MPa), and a stiffness modulus approaching that of the surrounding structure (>10 Gpa). Additional capabilities emerge if the material can be activated at low voltage, high temperatures (>150 degrees C.) and maintain its geometry when power is removed to exhibit "zero power hold."

Many solid state actuation technologies based on a variety of mechanisms are currently under development. Each material system exhibits a set of properties and actuation characteristics (strain, force, speed, actuation type, etc.) that yield suitability to specific applications.

Electrochemically-actuated material systems have emerged as promising candidates to cover a range of high-strain/high-force implementations. Polymer-based electrochemical systems have been the primary focus to-date with the majority of attention devoted to ionic polymer metal composites, or IPMCs, and conducting polymers. Recent advances in the performance of these materials have been impressive with strains to 15% and work densities above 80 kJ/m$^3$ for some combinations. The low voltage, light weight and potential low cost of these materials are attractive when considering large system integration.

Other polymers, specifically dielectric elastomers, show extremely large strains (>100%) at high rates with potentially high energy densities (up to 3.8 MJ/m$^3$) when subjected to strong electric fields (>100 MV/m).

Current research in the area of carbon-based active materials suggests material systems that are structurally stiff, but capable of relatively small strains when activated. By using double layer charge injection to increase the C—C bond length in carbon nanotubes, strains on the order of 0.1–0.2% and stresses in the MPa range have been demonstrated in carbon nanotube papers. Carbon nanotube-based actuators could deliver strain of >1% and stress outputs of hundreds of MPa.

SUMMARY

In some embodiments, an actuator is provided having an actuation region, which includes graphite, between its electrodes. An ion storage region is located between the electrodes, with a separator region being between the actuation and storage regions.

In some embodiments, an actuator is provided having an actuation region between electrodes. The actuation region includes graphite structures embedded in an elastic matrix and the elastic matrix is adapted to allow transport of chemical species capable of intercalating within the graphite structures. A separator region is located between the electrodes, and an ion generation region capable of reversible electrochemical production and elimination of ions is located between the electrodes.

In some embodiments, an actuator is provided having a piston located within a housing. A graphite structure is located within the piston. Adjacent the graphite structure is an electrolyte capable of supplying graphite intercalation species. A pair of electrodes is located so as to be capable of generating, from the electrolyte, ion species capable of intercalation within the graphite structure.

In some embodiments, an actuator is provided having an electrode and a counter electrode with an electrolyte therebetween. At least one of the electrode and the counter electrode includes graphite. The electrolyte has a graphite intercalate ion source.

In some embodiments, an apparatus is provided having graphite structure actuators spaced along a flexible member, the graphite structure actuators are at least partially recessed within the flexible member so as to be capable of causing bending of the apparatus upon application of electrical signals to the graphite structure actuators.

BRIEF DESCRIPTION OF THE DRAWINGS

The features and advantages of the present invention will be better understood with regard to the following description, appended claims, and accompanying drawings where:

FIG. 2A shows a cut away top view of a simplified illustration of a piston of a solid state actuator in accordance with one embodiment of the present invention.

FIGS. 2B and 2C show cut away side views of a simplified illustration of the solid state actuator of FIG. 2A.

DESCRIPTION

Figure 1A:
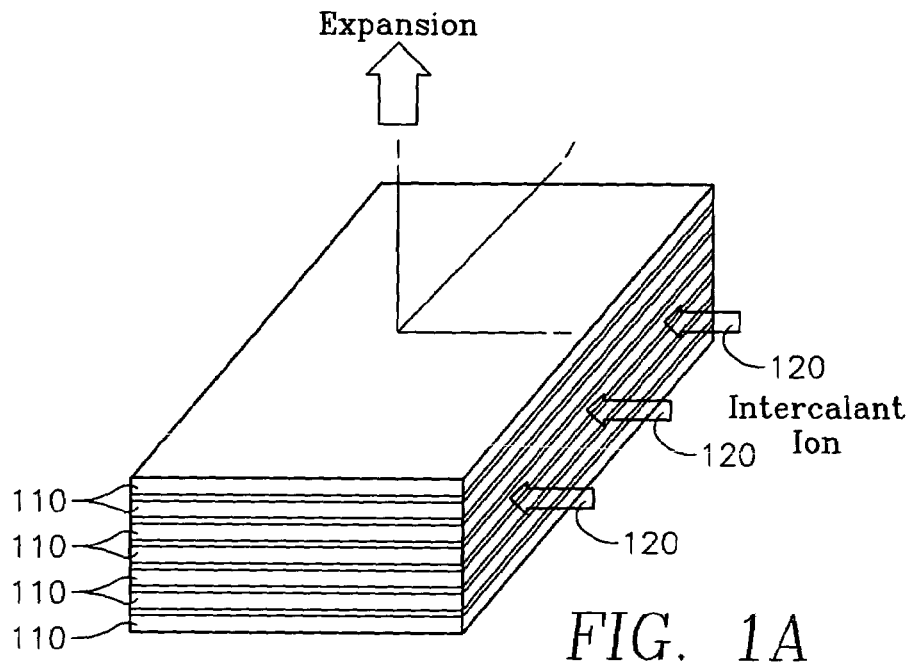
FIGS. 1A and 1B illustrate a basic example of a graphite intercalation mechanism, with FIG. 1A depicting a perspective view of the mechanism of intercalation and FIG. 1B depicting a molecular illustration of the mechanism of intercalation.
Figure 1B:
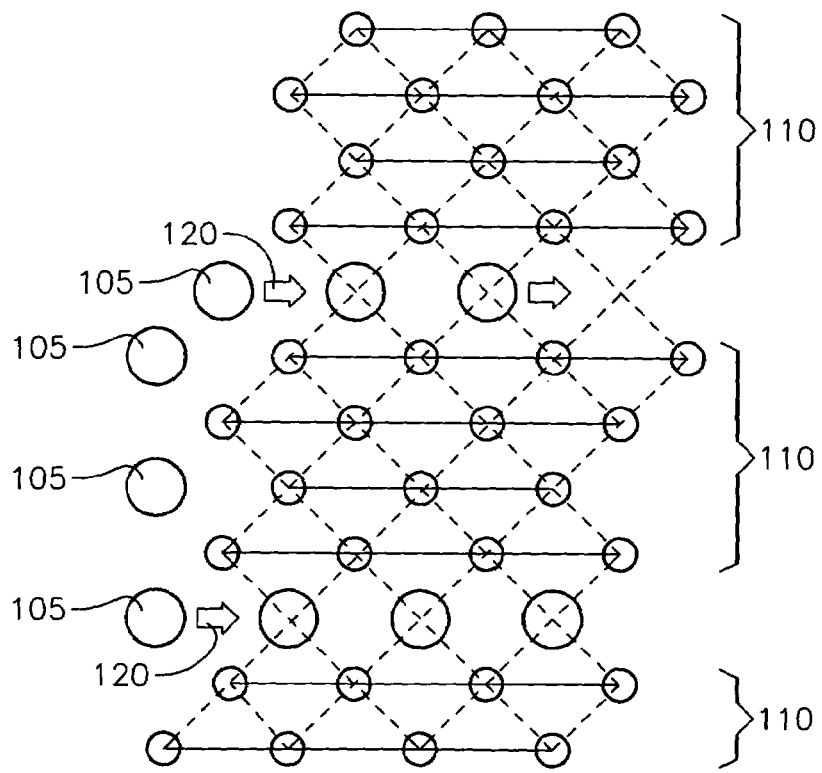

Graphite Intercalation (FIGS. 1A and 1B)

Graphite intercalation compounds or GICs are a class of reversible, electrochemically-induced compounds that may be exploited to provide a useful combination of simultaneous high strain and high force actuation. In addition, characteristics of high temperature operation and zero-power hold at low applied voltages, in some embodiments below about 5V, may be exploited in solid state actuation.

Graphite is organized into hexagonal carbon layers, with the layers interacting through weaker van der Waals bonds. The basal plane elastic modulus of ~1 TPa results from the hybridized $sp^2$ covalent bonding, but the van der Waals bonding normal to the basal planes results in an orthogonal elastic modulus two orders of magnitude lower (20–40 GPa). Expansion occurs during intercalation of ions between the graphite planes 110, shown in FIGS. 1A and 1B. FIG. 1A shows intercalation of ions (indicated by arrows 120), between the graphite planes 110 on a macro scale. FIG. 1B shows a molecular level illustration of the intercalation 120 of ions 105, for example $HSO_4$, between the graphite planes 110. Strains of 100% or more have been measured depending on the intercalate species which can be an acid, alkali metal, halogen, metal halide, or metal oxide, or organic ions such as tetraalkyl ammonium cations and $BF_4^-$, $PF_6^-$, and $ClO_4^-$.

Further, the ordering of the intercalated ions between the planes leads to the formation of stable phases, often termed "stages". These phases or stages are maintained if the intercalation process is halted offering up the possibility of a "zero-power hold" capability for a GIC-based actuator. Like ionic polymers, the expansion rate is much slower than field activated materials, being limited by how fast the intercalated ions diffuse into the host.

Illustrative of constant-current electrochemical GIC formation under static compressive loading conditions up to 8 MPa for several "model" systems are: single-crystal highly-oriented pyrolytic graphite or HOPG, nanocrystalline HOPG, graphite foam, and highly porous graphitic paper; all four cases employed $HSO_4^+$ as the intercalated ion. For the HOPG systems, energy densities of about 500 kJ/m3 and strains greater than 30% were between 2 and 6 MPa have been shown. The graphitic paper samples exhibit reduced performance (15% at 0.85 MPa), but with better stability at higher actuation rates. Single-crystal samples exhibit the most robust behavior, but are significantly more kinetically constrained than the other cases.

Actuator Embodiments (FIGS. 2A–11)

FIG. 2A shows a cut away top view of a simplified illustration of a piston 230a of a solid state actuator 200 in accordance with one embodiment of the present invention. In this embodiment, a tube shaped graphite portion 210 surrounded by electrolyte 220 disposed within a piston 230a. A portion of the electrolyte 220a is contained within the tube shaped graphite portion 210. A portion of the electrolyte 220b surrounds the exterior of the tube shaped graphite portion 210. Shown in FIG. 2B, a housing 230b surrounds the piston 230a. FIGS. 2B & 2C show cut away side views of a simplified illustration of the solid state actuator 200 of FIG. 2A. FIG. 2B shows the solid state actuator 200 before application of an actuation voltage V across the electrodes 250. FIG. 2C shows the solid state actuator 200 after application of an actuation voltage V across the electrodes 250.

Application of the actuation voltage V causes ions in electrolyte 220 to intercalate into the graphite 210, which causes the piston 230a to extend from the housing 230b as indicated in FIG. 2C. Reversal of the polarity of the actuation voltage V causes the piston to compress into the housing 230b. An optional spring 240 may be provided to provided additional bias to return the piston 230a into the housing 230b. Graphitic materials are generally weak in tension so the spring 240 may be provided, depending on the particular application and particular configuration of the graphite structure 210. The counter electrode 250 may extend along the entire wall of the piston 230a. Furthermore, the electrode 250 may be located at the top, bottom, or both locations, of the graphite structure 210.

Figure 3:
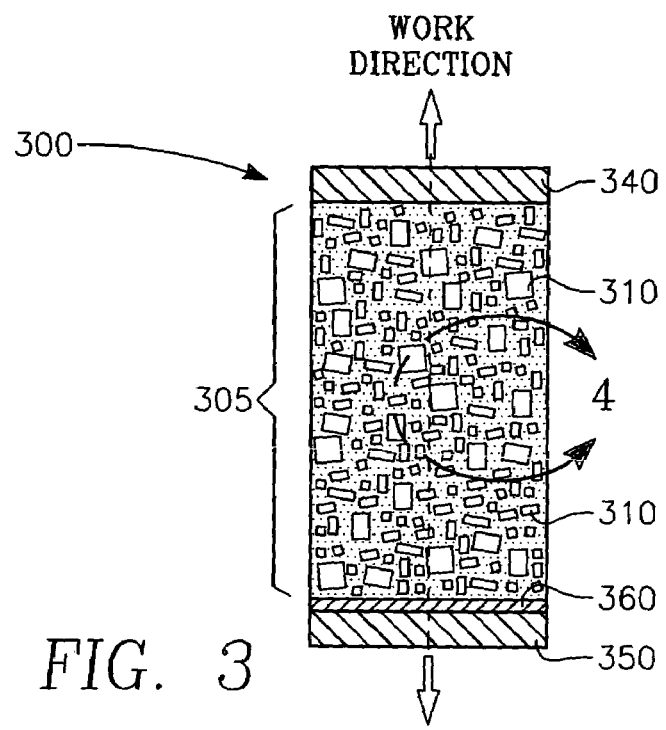
FIG. 3 is a cross sectional side view of an actuator in accordance with an embodiment of the invention.

Turning to FIG. 3, the dimensional change mechanism discussed above may be incorporated into an actuator assembly 300, capable of yielding a micro, or even macro scale realization of the molecular scale change in architecture. In particular, certain embodiments incorporate a plurality of solid state actuator pieces 310 in a matrix material 420 (shown in FIG. 4), and further incorporate an electrochemical means to provide the necessary intercalate species.

FIG. 3 is a cross sectional side view of an actuator assembly 300 in accordance with one embodiment of the invention. An actuation region 305 is located between electrodes 340 and 350. The electrodes 340 and 350 are formed of electrically conductive material, such as for example gold, or another conductor. A separator region 360 is located between the actuation region 305 and the electrode 350.

The separator region 360 provides physical isolation to inhibit electrical shorting, while allowing the flow of ions between the electrode 350 and the actuation region 305. The separator region 360 may be a porous polymer membrane, such as polypropylene, which is impregnated with an electrolytic solution for example strong acids, including $H_2SO_4$, $HClO_4$, $HNO_3$ or the like; alkali metal salts; and ionic fluids, including but not limited to room temperature ion fluids, such as 3-alkylimidazolium borofluoride (the alkyl can be replaced with methyl, ethyl, and butyl), ammonium tetrafluoroborate, and lithium hexafluorophosphate in propolene carbonate, or the like.

Figure 4:
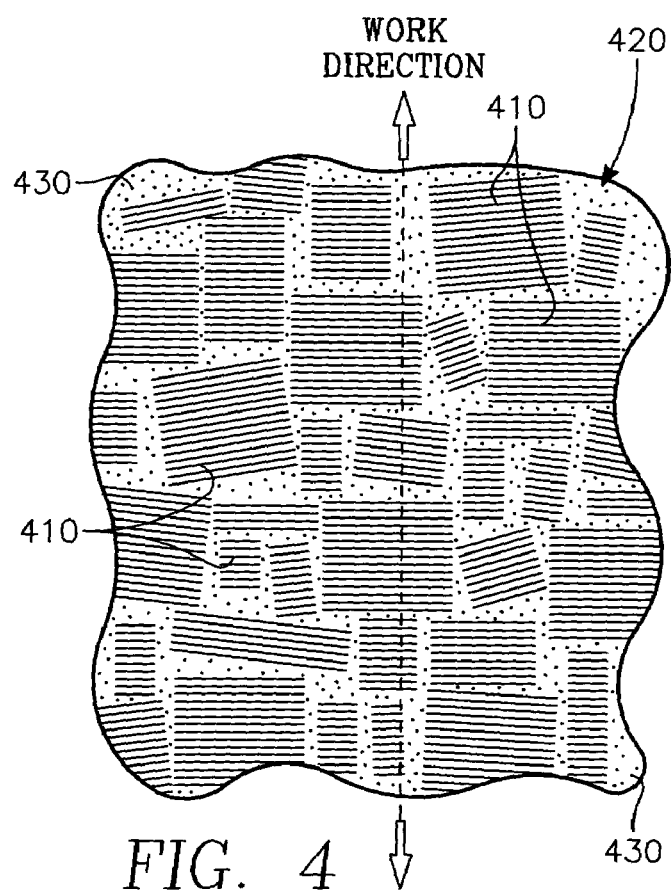
FIG. 4 shows a cut away exploded view of the actuation region 305 along the 4—4 line of FIG. 3.

FIG. 4 shows a cut away exploded view of the actuation region 305 along the 4—4 line of FIG. 3. The actuation region 305 includes a plurality of graphitic structure pieces 410 embedded within a matrix 420. In this embodiment, the matrix 420 is an elastic material so that it transfers the volume expansion of the graphitic structure pieces 410.

Furthermore, the elastic matrix 420 is a material capable of allowing transport of chemical species capable of inserting into the graphitic pieces 410. The elastic matrix may be an elastic ion conducting polymer.

The graphitic structure pieces 410 are generally aligned within the elastic matrix 420 so that the direction of work of most of the of graphitic structure pieces 410 is facing in a substantially similar direction so as to provide an overall work direction (indicated by the arrows in FIG. 4). Thus, the graphitic structure pieces 410 may be generally oriented such that the planes of the inorganic material layers (illustrated by parallel lines within the graphitic structure pieces 410) of the plurality of graphitic structures pieces 410 are generally facing in a substantially same direction. The inorganic material layers of the different graphitic structure pieces 410 may be in substantially parallel planes with respect to the other graphitic structure pieces, and perpendicular to the work direction (indicated by the arrows in FIG. 4).

Alignment of the graphite structure pieces 410 may be accomplished using an electric field during fabrication, by spin coat deposition of the active region onto a substrate (which may have other deposition layers on it), and/or by other alignment means. The use of shaped graphite structure pieces 410 may be employed to achieve the same effect. For example, graphite structure pieces 410 of rod, fiber, tube, or other elongated shape may be utilized to assist in alignment, or to provide self-alignment of the graphite structure pieces 410.

Figures 5, 6:
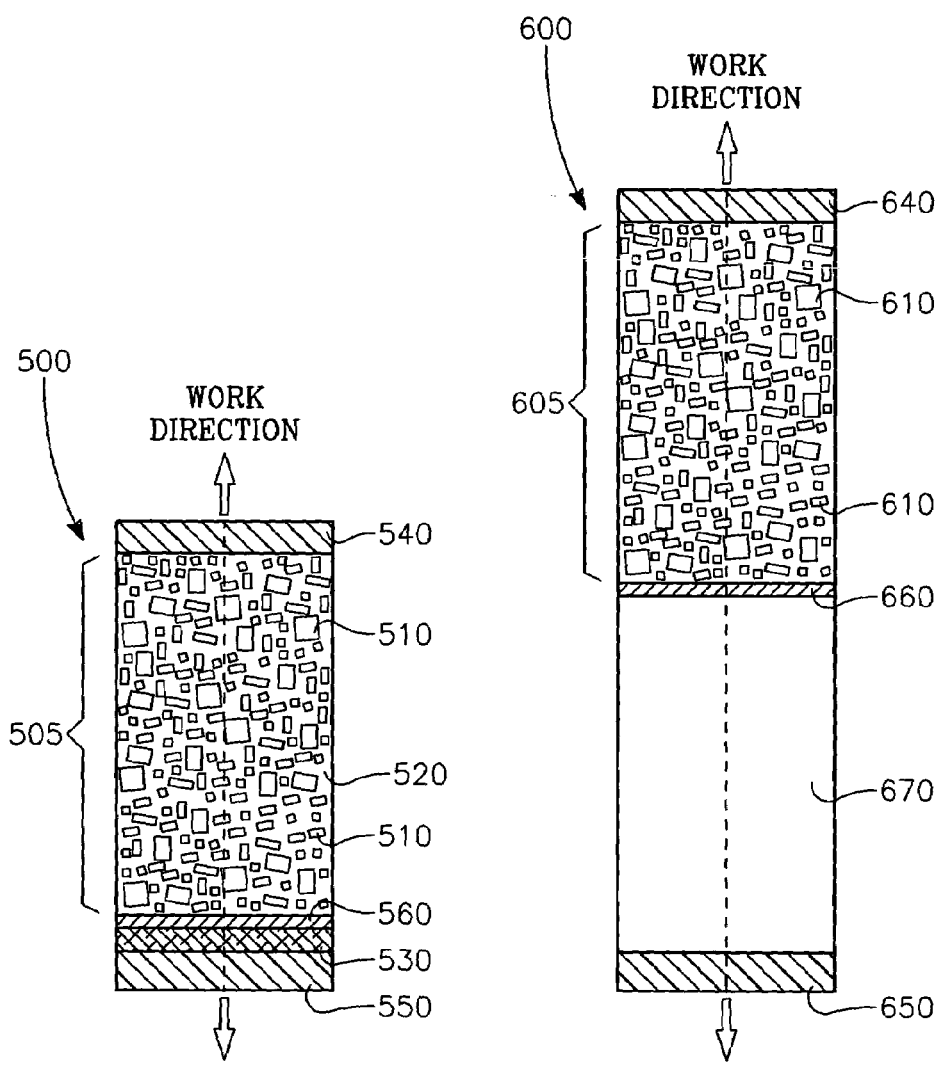
FIG. 5 is a cross sectional side view of an actuator in accordance with an embodiment of the invention.
FIG. 6 is a cross sectional side view of an actuator in accordance with an embodiment of the invention.

Although the graphite structure pieces 310, 410, and 510, in FIGS. 3–5, respectively, are shown separated by relatively large spacing for illustration purposes, they may be more densely packed. Moreover, it is possible to have one, or several continuous graphite structure piece(s), not shown, extending to (or near) adjacent regions, structures, or layers. For example, one, or several graphite structure(s), not shown, having a continuous stack of layers may extend from (or nearly from) the electrode 340 to (or nearly to) the separator 360.

In the embodiment of FIGS. 3 and 4, within the matrix 420 are conductive particles 430, which provide electrical conduction within the matrix 420. The ion conducting polymer matrix 420 provides pathways to transport the ions to the graphite structure pieces 410.

The conductive particles 430 may include metal particles, carbon nanotubes, other conductive nanoparticles, or the like. Carbon or other electrically conducting nanotubes, or nanowires, are expected to be a better choice over metal particles due to their high aspect ratios leading to a low percolation concentration.

FIG. 5 is a cross sectional side view of an actuator assembly 500 in accordance with another embodiment of the invention. The actuation region 505 is located between electrodes 540 and 550. In the embodiment of FIG. 5, the region 530 is for chemical species storage capable of anion generation, between the separation region 560 and the electrode 550. Thus, the region 530 is separated from the actuation region 505 by the separator region 560. The region 530 may be a conducting porous material impregnated with aqueous electrolyte to supply/remove anions to/from the actuation region 505.

As discussed above, the separator region 560 provides isolation to inhibit electrical shorting while allowing the flow of anions between the electrode 530 and the actuation region 505. The separator region 560 may be a porous polymer membrane, such as polypropylene, which is impregnated with an electrolytic solution, such as, for example, $H_2SO_4$, $HClO_4$, $HNO_3$, or the like.

The elastic matrix 520 is a material capable of allowing transport of anions capable of intercalating within the graphite structure pieces 510. Because region 530 is located separate from the actuation region 505 conductive particles are not utilized in the embodiment shown in FIG. 5. In other embodiments (not shown), however, conductive particles may be included in the elastic matrix 520 in addition to a region 530, if desired.

FIG. 6 is a cross sectional side view of an actuator assembly 600 in accordance with another embodiment of the invention. The region 670 is for chemical species storage capable of cation generation, between the separation region 660 and the electrode 650. Thus, the region 670 is separated from the actuation region 605 by the separator region 660. In this embodiment, the region 670 stores chemical species capable of generating cations for intercalation within the graphite particles 610. For example, the region 670 may be an alkali metal storage region.

In one embodiment region 670 is a lithium storage material, preferably formed of a material that does not show large changes in volume. The lithium storage material may be formed of: carbonaceous materials; transition metal oxides such as lithium titanium oxide, lithium manganese oxide, lithium cobalt oxide, lithium nickel oxide, etc.; lithium metal phosphates such as lithium iron phosphate, lithium vanadium phosphate, lithium manganese phosphate, lithium cobalt phosphate, etc.; or other materials known in the lithium ion battery field. In one embodiment, the lithium storage material is composed of lithium titanium oxide, such as $Li_{4+x}Ti_5O_{12}$, where x is 0–3. Lithium titanate is a ceramic material, with high stiffness, which can store large amounts of lithium, and also does not significantly change in volume. Other types of lithium containing compounds which can reversibly accept and release lithium without experiencing significant volume change during the process are possible. Moreover, the lithium storage material may include solid inorganic compounds that have polymer lithium conducting mediums or additives.

With lithium intercalation, the separator region 660 is a solid lithium ion conductor and may be a super ionic conductor such as lithium sulfide, for example $Li_{4-x}Ge_{1-x}P_xS_4$ (0.4<x<0.8). This is a high stiffness material that exhibits acceptable lithium ion transport at room temperature, and excellent transport at elevated temperatures as low as 100° F. In the above example the phosphate can be replaced with nitrogen or the like, and/or the germanium may be replaced with silicon or the like.

The separator region 660 may be a high stiffness material. High stiffness lithium ion conductor materials are well suited for use in actuators. High stiffness materials include ceramics and other crystal lattice material, as well as some strong amorphous materials. Some amorphous materials, such as vacuum deposited amorphous materials, are high stiffness materials as they have sufficient strength to support actuation. Typically high stiffness materials exhibit stress output of about 50 Gpa or more. Most inorganic lithium ion conductors are high stiffness. Many high stiffness ion conductors are possible, for example: super ionic conductors, such as, lithium sulfide, LiSICON, Thio-LiSICON; doped lithium materials such as doped lithium sulfide, nitrogen doped lithium phosphate or Li—N—P—O, zirconium doped lithium silicate or Li—Si—Zr—O, Li—B—O, Li—B—O—I, Li—Si—P—O, Li—Nb—P—O, Li—B—S, Li—La—Ti—O, Li—Ti—Al—P—O, Li—Si—Al—O, etc.; or other materials known in the lithium ion battery field.

It is significant to note that in an actuator, ion conductor material which allows leakage current is acceptable in certain embodiments, as charge conservation is not always paramount in actuator implementations. For example, Thio-LiSICON contains sulfur which can allow charge leakage. Nevertheless, it may be utilized in certain actuator embodiments due to its strong material properties.

Lithium actuation is disclosed in related U.S. patent application Ser. No. 10/927,965, by Liu et al., filed Aug. 28, 2004, entitled ACTUATION USING LITHIUM/METAL ALLOYS AND ACTUATOR DEVICE, herein incorporated by reference in its entirety.

In some embodiments, the generation of smaller ion species provides faster transportation and intercalation to improve actuation kinetics.

Figure 7A:
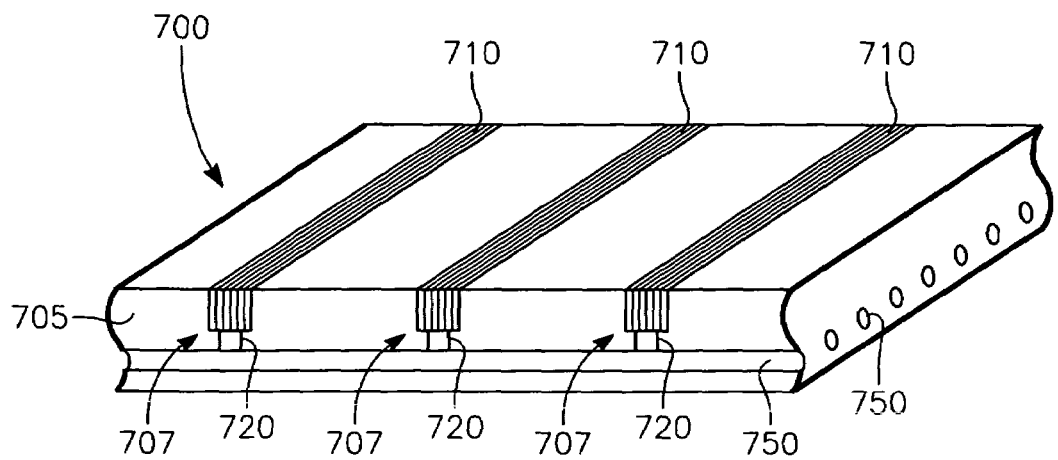
FIG. 7A shows a perspective view of one example of an apparatus with a system of distributed graphite structure actuators.

FIG. 7A shows a perspective view of one example of an apparatus 700 with a system of distributed graphite structures 710. The graphite structures 710 are located in a flexible member 705, which may be a composite material. A counter electrode 750, runs within the flexible member 705. Electrolytic channels 720 (solid or liquid) interconnect the counter electrode 750 with the graphite structures 710 to form graphite structure actuators 707. The counter electrodes 750 may be one or more counter electrodes, which may be located at an exterior surface such as surface 705*b* (referenced in FIG. 7B), of the flexible member 705.

The graphite structures 710 may function as electrodes for the graphite structure actuators 707. Or, a separate electrode (not shown) may be included.

In the embodiment of FIGS. 7A–11, the electrolyte may contain the intercalate species. In some embodiments, however, an intercalate ion source (not shown in FIGS. 7A–11) may be provided along with the counter electrode 750. The ion source may be a region for chemical species storage capable of anion generation, similar to region 530 shown in FIG. 5, or a region capable of cation generation similar to region 670 shown in FIG. 6. In such embodiments, the electrolytic channels 720 interconnect the ion source with the graphite structures 710.

Figure 7B:
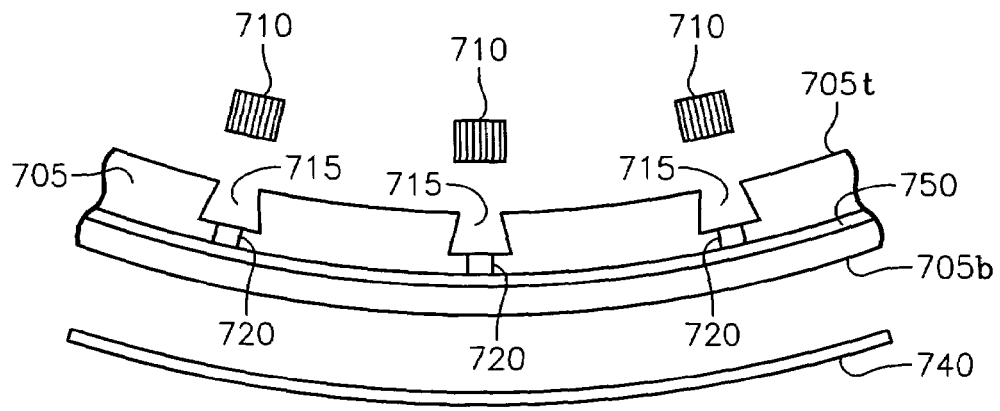
FIG. 7B shows an exploded view of an apparatus with a system of distributed graphite structure actuators.

FIG. 7B is an exploded view of a possible embodiment. Graphite structures 710 (shown outside their respective channels) are placed in respective channels 715 in a flexible composite member 705. An optional biasing member 740 may be attached to, integrated into, or otherwise associated with, the flexible composite 705. For example, the biasing member 740 may be secured to a side 705*b* of the flexible member 705 opposite the side 705*t* containing the graphite structures 710. As above, a counter electrode 750, runs within the flexible member 705. Electrolytic channels 720 (solid or liquid) interconnect the counter electrode 750 with the graphite structures 710.

Figure 7C:
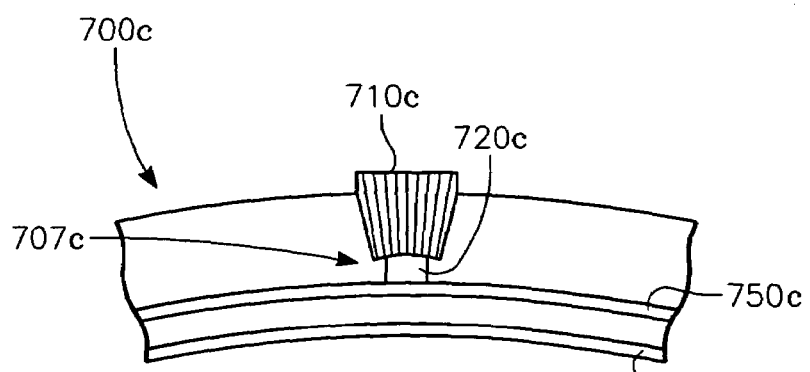
FIG. 7C shows an enlarged cross section side view of an apparatus with a graphite structure actuator.
Figure 8:
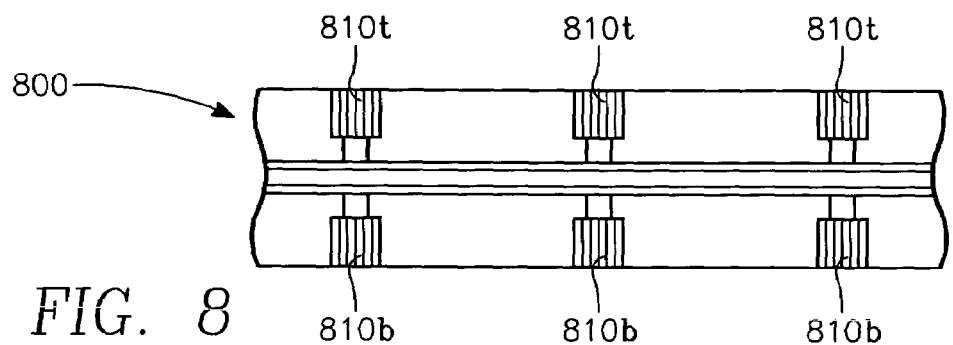
FIG. 8 shows a cross section side view of an apparatus including opposing graphite structure actuators.

FIG. 7C shows an enlarged cross section side view of a portion 700*c* of an apparatus with a graphite structure actuator 707*c*. Electrolytic channel 720*c* (solid or liquid) interconnects the counter electrode 750*c* with the graphite structure 710*c*. As illustrated in FIG. 7C, when intercalated, the graphite structure 710*c* will expand under load, inducing a surface strain on the apparatus 700*c* causing it to bend. A compressive load is maintained on the graphite structure 710*c*. The graphite structure 710*c* may be discrete components, or long strips, capable of providing a bending force along a line. A restoring force is provided by elastic properties of the material of the apparatus, by an integrated spring mechanism (shown as bias member 740*c* in this embodiment), graphite structures on an opposing surface (shown in FIG. 8), or some combination thereof. FIG. 8 shows a cross section side view of a possible apparatus 800 including opposing graphite structures 810*t* and 810*b*.

Figure 9:
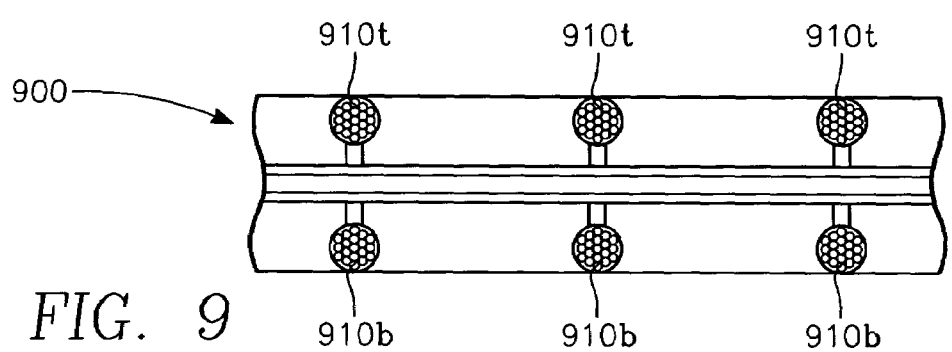
FIG. 9 shows a cross section side view of an apparatus with a system of distributed graphite structure actuators.
Figure 10:
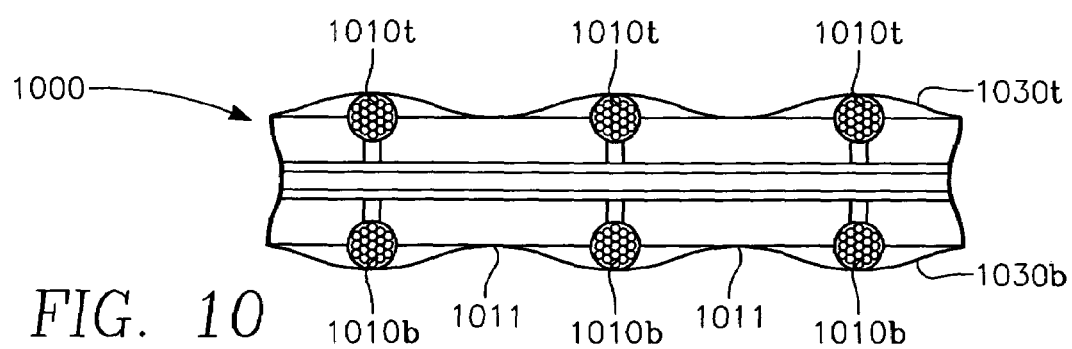
FIG. 10 shows a cross section side view of an apparatus with a system of distributed graphite structure actuators.

Turning to FIGS. 9 and 10, in some embodiments, the graphite structures 910*t* and 910*b* or 1010*t* and 1010*b*, respectively, are lengths of woven, or of braided, highly graphitic carbon fiber. When intercalated, the carbon fiber structures 910*t* and 910*b* or 1010*t* and 1010*b*, respectively, swell circumferentially, inducing a bending force. FIGS. 9 and 10 show two ways that the graphite expansion can be transferred to bending. In FIG. 9, the graphite structures 910*t* and 910*b* apply pressure laterally within the apparatus 900 to cause bending of the apparatus 900. In FIG. 10, a moment in the apparatus 1000 is generated when force from the graphite expansion of the graphite structures 1010*t* and/or 1010*b* is applied to a flexible sheet 1030*t* and/or 1030*b*, respectively, or to a stringer, or other surface component. In some embodiments, a compressive load may be applied into the apparatus 1000 for example, by the flexible sheet 1030*b* at locations 1011.

Figure 11:
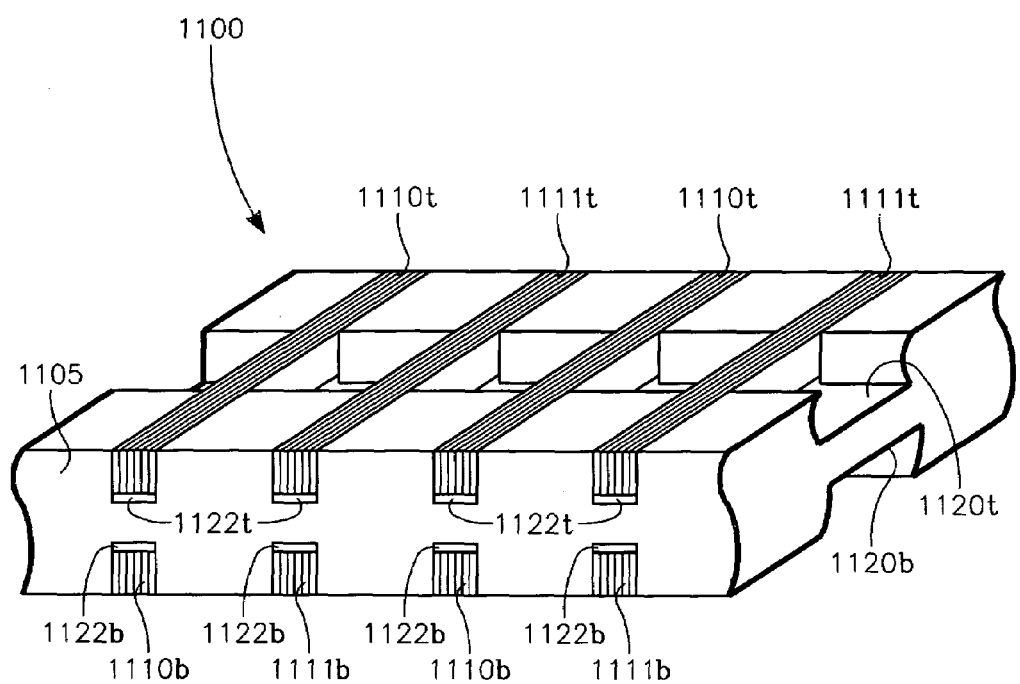
FIG. 11 shows a perspective view of an apparatus with graphite structure electrodes.

Turning to FIG. 11, in some possible embodiments, the graphite structures 1110*t* and 1111*t* are both electrodes, capable of swelling when intercalated. Both graphite structure electrodes 1110*t* and 1111*t* can be made to swell reversibly during intercalation. This can enhance the strain capability of the system. The graphite structure electrodes 1110*t* and 1111*t* are arranged in the flexible member 1105 with alternating anodes 1110*t* and cathodes 1111*t*. Electrolyte (not shown) may be provided between the electrodes 1110*t* and 1111*t* to provide both an anion and cation source.

In the embodiment shown, the electrolyte may be located in a main channel 1120*t* running between adjacent anodes 1110*t* and cathodes 1111*t*. In some embodiments as shown in FIG. 11, branch channels 1122*t*, connected to the main channel 1120*t*, run along the length of the graphite structure electrodes 1110*t* and 1111*t* to provide ions adjacent the graphite structure electrodes 1110*t* and 1111*t* for intercalation. In other embodiments, branch channels 1122*t* are not necessary. For example, with braided graphite structure electrodes (not shown in FIG. 11) the electrolyte may be provided within the braids.

As above, graphite structure electrodes 1110*b* and 1111*b* may be placed on an opposite side of the apparatus 1100 from the graphite structure electrodes 1110*t* and 1111*t*, if desired. Similarly, branch channels 1122*b* may extend from the main channel 1120*b* along the graphite structure electrodes 1110*t* and 1111*b*.

Having described this invention in connection with a number of embodiments, modification will now certainly suggest itself to those skilled in the art. Features and arrangements discussed in connection with one or more of the various embodiments described herein may be incorporated into, combined with, or used to modify, the various other embodiments described herein. The invention is not to be limited to the disclosed embodiments except as required by the appended claims.

What is claimed is:

1. An actuator comprising:
   a) electrodes;
   b) an actuation region between the electrodes, the actuation region comprising graphite;
   c) an ion storage region located between the electrodes, said ion storage region comprising a material different than said actuation region; and
   d) a separator region between the actuation region and the storage region.

2. The actuator of claim 1 wherein the actuation region comprises:
   a) a plurality of graphite structures;
   b) an elastic matrix holding the plurality of graphite structures, the elastic matrix being adapted to allow transport of intercalation species; and
   c) the plurality of graphite structures being generally aligned within the elastic matrix so as to be capable of providing displacement along a direction of work.

3. The actuator of claim 1 wherein the actuation region comprises a single graphite structure.

4. The actuator of claim 1 further comprising electrically conductive particles embedded within the elastic matrix.

5. The actuator of claim 1 wherein the ion storage region comprises an alkali metal storage region.

6. The actuator of claim 5 wherein the ion storage region comprises a lithium storage region.

7. The actuator of claim 1 wherein the ion storage region comprises an electrolyte.

8. The actuator of claim 7 wherein the ion storage region comprises an acid.

9. The actuator of claim 8 wherein the ion storage region comprises one of: (1) $H_2SO_4$; (2) $HClO_4$; or (3) $HNO_3$.

10. An actuator comprising:
    a) electrodes;
    b) an actuation region between the electrodes, the actuation region comprising:
        (i) a plurality of graphite structures; and
        (ii) an elastic matrix holding the plurality of graphite structures, the elastic matrix being adapted to allow transport of chemical species capable of intercalating within the graphite structures;
    c) a separator region between the electrodes; and
    d) an ion generation region between the electrodes capable of reversible electrochemical production and elimination of ions.

11. The actuator of claim 10 wherein the ion generation region is located on a side of the separator region opposite the actuation region and located between one of the electrodes and the separator region.

12. The actuator of claim 11 wherein the conductive particles comprise at least one of: (a) carbon nanotubes; (b) metal fibers; or (c) metal nanoparticles.

13. The actuator of claim 10 wherein each of the plurality of graphite structures have a direction of work, and wherein the plurality of graphite structures are oriented such that the direction of work of each of the plurality of graphite structures is facing in a substantially similar direction.

14. The actuator of claim 10 wherein the each of the plurality of graphite structures have planes, and wherein the plurality of graphite structures are oriented such that the planes of the graphite structures are generally facing in a substantially same direction.

15. The actuator of claim 10 wherein the elastic matrix comprises an ion conducting material.

16. The actuator of claim 10 wherein the separator comprises a porous membrane impregnated with an electrolyte solution.

17. The actuator of claim 10 wherein the elastic matrix is substantially incompressible.

18. An actuator comprising:
    a) a piston within a housing;
    b) a graphite structure within the piston;
    c) an electrolyte capable of supplying graphite intercalation species, the electrolyte being adjacent the graphite structure;
    d) a pair of electrodes located so as to be capable of generating, from the electrolyte, ion species capable of intercalation within the graphite structure.

19. The actuator of claim 18 wherein the graphite structure is a tube structure.

20. The actuator of claim 19 wherein the electrolyte is located within the graphite tube structure and wherein the electrolyte surrounds the graphite tube structure.

21. The actuator of claim 18 wherein the electrolyte surrounds the graphite structure.

22. The actuator of claim 18 further comprising a spring biasing the piston.

23. The actuator of claim 18 wherein the electrolyte comprises one of (1) a strong acid; (2) alkali metal salts; or (3) ionic fluids.

24. The actuator of claim 18 wherein the electrolyte comprises one of: (1) $H_2SO_4$; (2) $HClO_4$; or (3) $HNO_3$; (4) 3-alkylimidazolium borofluoride; (5) 3-methylimidazolium borofluoride; (6) 3-ethylimidazolium borofluoride; (7) 3-butylimidazolium borofluoride; (8) ammonium tetra fluoroborate; or (9) lithium hexafluorophosphate in propolene carbonate.

25. An actuator comprising an electrode and a counter electrode with an electrolyte therebetween, at least one of the electrode and the counter electrode comprising graphite, and wherein the electrolyte comprises a graphite intercalate ion source.

26. The actuator of claim 25 wherein the electrode and the counter electrode comprise graphite, and wherein the electrolyte comprises an electrolyte capable of providing intercalate species capable of intercalating within the electrode and within the counter electrode.

27. An apparatus comprising graphite structure actuators spaced along a flexible member, the graphite structure actuators being at least partially recessed within the flexible member so as to be capable of causing bending of the apparatus upon application of electrical signals to the graphite structure actuators.

28. The apparatus of claim 27 wherein the graphite structure actuators comprise elongated graphite structures within channels in the flexible member.

29. The apparatus of claim 28 further comprising:
    a) a counter electrode; and
    b) a channel within the flexible member between the elongated graphite structures and counter electrode, the channel comprising electrolyte solution.

30. The apparatus of claim 27 wherein the graphite structure actuators comprise graphite structures located at a side of the flexible member.

31. The apparatus of claim 30 further comprising a biasing member associated with the flexible member.

32. The apparatus of claim 27 wherein the graphite structure actuators comprise graphite structures located at opposing sides of the flexible member.

33. The apparatus of claim 27 wherein the graphite structure actuators comprise graphitic carbon fiber graphite structures.

34. The apparatus of claim 27 wherein the graphite structure actuators comprise graphite structures oriented so as to apply lateral force within the flexible member.

35. The apparatus of claim 27 further comprising a flexible surface component over a surface of the flexible member, and wherein the graphite structure actuators comprise graphite structures positioned between the flexible surface component and the flexible member such that expansion of the graphite structures causes displacement of the flexible surface component.

36. The apparatus of claim 35 wherein the flexible surface component is capable of applying a compressive load to the flexible member in response to the displacement of the flexible surface component.

37. The apparatus of claim 27 wherein the graphite structure actuators comprise:
    a) graphite structures;
    b) a counter electrode; and
    c) an electrolyte region coupling the graphite structures with the electrode.

38. The apparatus of claim 37 wherein the electrolyte region comprises species capable of intercalation in the graphite structures.

39. The apparatus of claim 37 further comprising an intercalate ion source region, the electrolyte region connecting the intercalate ion source region and the graphite structures.

40. The apparatus of claim 37 wherein the graphite structures form electrodes.

41. The apparatus of claim 37 further comprising an electrolyte in the electrolyte region, and wherein the electrolyte comprises one of (1) a strong acid; (2) alkali metal salts; or (3) ionic fluids.

42. The apparatus of claim 27 wherein the graphite structure actuators comprise:
   a) graphite structure electrodes;
   b) graphite structure counter electrodes; and
   c) an electrolyte region between the graphite structure electrodes and the graphite structure counter electrodes.

43. The apparatus of claim 42 wherein the electrolyte region comprises an electrolyte capable of providing intercalate species capable of intercalating within the graphite structure electrodes and within the graphite structure counter electrodes.

44. The apparatus of claim 42 wherein the electrolyte region comprises a channel in the flexible member extending between adjacent ones of the graphite structure electrodes and the graphite structure counter electrodes.

45. The apparatus of claim 44 wherein the electrolyte region further comprises branch channels extending adjacent at least one of: (a) the electrodes; or (b) the counter electrodes from the channel extending between adjacent the graphite structure electrodes and the graphite structure counter electrodes.

* * * * *